Jan. 27, 1925.  
S. BROWN  
1,524,335  
COMPOSITE ARTICLE AND METHOD OF PREPARING SAME  
Filed Jan. 15, 1924
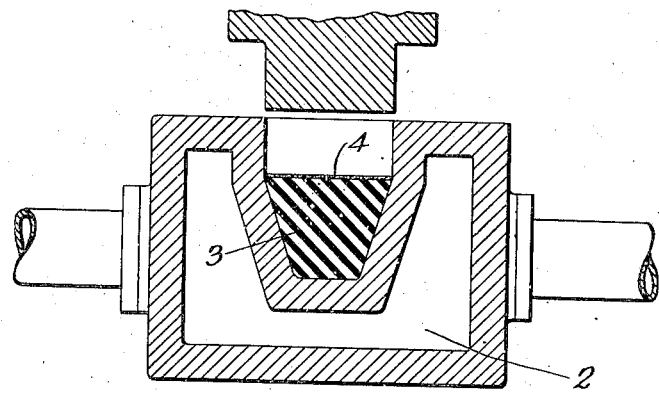
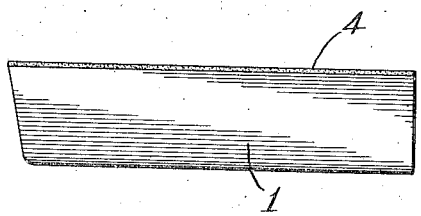
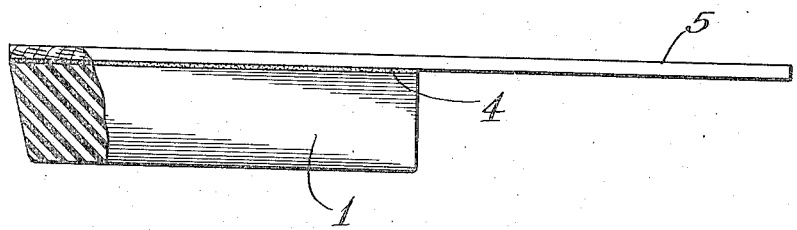
Inventor  
Sandford Brown,  
By his Attorneys,  
Ward, Crosby and Smith Patented Jan. 27, 1925.

1,524,335

UNITED STATES PATENT OFFICE.

SANDFORD BROWN, OF MONTCLAIR, NEW JERSEY, ASSIGNOR TO BAKELITE CORPORATION, OF NEW YORK, N. Y., A CORPORATION OF DELAWARE.

COMPOSITE ARTICLE AND METHOD OF PREPARING SAME.

Application filed January 15, 1924. Serial No. 686,469.

*To all whom it may concern:*

Be it known that I, SANDFORD BROWN, a citizen of the United States, and resident of Montclair, county of Essex, and State of New Jersey, have invented certain new and useful Improvements in Composite Articles and Methods of Preparing Same, of which the following is a specification.

The invention relates to improvements in composite articles and method of preparing same and particularly to articles formed of phenolic condensation products having secured thereto wood or other fibrous material of a nature not adapted to be secured directly to the condensation product article by the use of a cold adhesive, and methods of forming the same.

Difficulties often arise when it is desired to make use of a phenolic condensation product for the formation of a part which must have secured thereto a strip or piece of wood, or the like. Wood and similar fibrous materials cannot be secured directly to a surface of an article formed of an infusible phenolic condensation product, by the use of the usual adhesives, such as glue applied in the manner customary in securing two pieces, for example, of wood, together, that is by simply applying the adhesive to the members which are to be joined and allowing the adhesive to set. The adhesive in such case will not form a bond, or a sufficiently tenacious bond, with the surface of the condensation product article. It is possible to form such a joint by a method in which a considerable amount of heat is used in which case the adhesive will form a considerable bond with the condensation product article, but this is not feasible in many cases because of the fact that the wood or other fibrous material is warped, or otherwise injuriously affected by the applied heat. Also, in many cases, as where the wooden part must be true and exact in form, the desired composite article cannot be made by inserting the wood into the mould as an insert in the condensation product article during the moulding and reaction under heat of the material which forms the condensation product, because of the fact that the heat would warp the wood, etc. Such a method also would be impractical in many cases because of the fact that the wooden member would be too long or too large to be included in the mould.

I overcome these difficulties by moulding the condensation product article with a strip of absorbent fibrous or cellular material, such as paper, pressed against a surface of the reactive material in the mould. This strip will accordingly be autogenously secured to the moulded condensation product article when the reaction is complete and the condensation product article is completely moulded. At the same time the opposite side of the strip will remain absorbent, so that it will take glue or other adhesive well. After removing the article with attached strip from the mould, the desired member of wood, or the like, is firmly secured to the condensation product article by gluing the wood, by the use of any suitable cold adhesive, to the strip which is autogenously secured to the condensation product article.

The invention accordingly comprises a process of the character referred to and the composite article formed thereby as a new article of manufacture. The objects of the invention comprise the provision of such a process and various process steps employed therein and the provision of an improved article of manufacture of the character indicated, in which the wood or similar fibrous or cellular material joined to the condensation product article is unwarped or otherwise injuriously affected, all as will more fully appear in the following specification, the invention being more particularly pointed out in the appended claims.

In order that the invention may be more clearly understood attention is hereby directed to the accompanying drawings forming part of this application and illustrating, by way of example, the method of forming a piano key, or the like, of a phenolic condensation product, and securing the same to a wooden lever member. In the drawings Fig. 1 is a sectional view through a mould in which the condensation product material is to be moulded with a strip of absorbent paper pressed against one face thereof;

Fig. 2 is a side elevation of the moulded piano key with the strip of paper autogenously secured thereto, and Fig. 3 is a side elevation of the piano key after the wooden lever member has been glued to the paper strip.

Referring to the drawings, the piano key 1, or object which is to be secured to a wooden or other fibrous member of the character referred to, is formed of an infusible phenolic condensation product. This article is moulded in the usual way in a mould 2, which is indicated as a usual form of two part mould. The ingredients from which the condensation product is to be moulded are placed in the mould as indicated at 3. These ingredients may comprise one of the usual moulding mixtures comprising substances which react on application of sufficient heat to form an infusible phenolic condensation product with or without the addition of suitable filling material, all as is well known. The moulding mixture may comprise, for example, a fusible phenol resin having a methylene-containing hardening agent mixed therewith, together with a suitable proportion of filling material, such as wood flour.

The strip 4 of absorbent paper or the like is placed in the mould on top of the ingredients placed therein, or otherwise, in position to press against the surface of the moulded article which is to be joined to the wooden or fibrous strip. When the mould is closed this paper strip will be pressed against the surface of the material in the mould. Upon application of heat and pressure in the usual way, the ingredients will react to form an infusible insoluble phenolic condensation product of the desired form with the paper strip autogenously joined to a surface thereof, as is indicated in Fig. 2.

The moulded article when completed is removed from the mould and a suitable adhesive is applied to the strip 4 or to the wooden member 5, which is to be joined thereto, or to both, the wooden member 5 is pressed into close engagement with the strip 4 and the glued joint is allowed to set in the usual way. Any suitable cold adhesive, suitable for joining together wood and paper or the like may be used. The wooden strip 5 in the form of the invention shown in the drawings, is a wooden lever which extends back from the piano key as part of the piano action. It is evident that this wooden member is secured firmly to the condensation product piano key, and that the wood has not been subjected to warping or any other harmful action in the process by which the parts were secured together.

It will be noted that in my process the absorbent strip of paper or the like bonds firmly to the condensation product article, during the molding of the latter, by the condensation product entering to some extent into, or fastening firmly to, the adjacent surface of the paper, without, however, flowing entirely through or impregnating the paper. Accordingly the opposite side of the paper remains sufficiently porous and absorbent to take glue well. The paper should be sufficiently thick and of sufficient body to prevent the condensation product material, prior to its final hardening, penetrating entirely through the same. The thickness required will differ in accordance with the character of the paper, but may be from 5/1000 to 10/1000 of an inch thick, for example, or somewhat thinner in some cases. The process is best practised with a molding mixture or material which does not become thinly fluid during the molding operation.

It should be understood that the invention is not limited strictly to the exact details of process and construction of the article otherwise than as is indicated by the accompanying claims.

What I claim is:

1. A process of forming a composite article, comprising, placing in a suitable mold materials adapted to react, on application of heat, to form a hard infusible phenolic condensation product, placing a strip of fibrous or cellular material in the mold, in position to bear against a surface of the confined reactive material when the mold is closed, molding the material under heat and pressure while pressing the said strip against a surface of the same, to form a desired article of infusible phenolic condensation product with said strip adhering thereto, and thereafter securing, by the use of suitable adhesive, wood or other fibrous material to said strip.

2. A process of forming a composite article, comprising, molding a phenolic condensation product article with a strip of paper pressed against a surface thereof, in the mold, so as to adhere to the molded article, and securing a wooden member firmly to said strip by a cold adhesive.

3. A process of forming a composite article, comprising, molding a phenolic condensation product article with a strip of absorbent fibrous or cellular material pressed against a suface thereof, in the mold, so as to adhere to the article when the molding is completed, removing the same from the mold, and securing to said strip by the use of a cold adhesive a member formed of a fibrous material of a nature not adapted to be secured directly to said molded condensation product by the use of a cold adhesive.

4. A process of forming a composite article, comprising, molding a piano key with a strip of absorbent fibrous or cellular material pressed against a surface thereof, in the mold, so as to adhere to the molded key when the molding is completed, removing the same from the mold, and securing a wooden key lever member to said strip, by the use of a cold adhesive.

5. As a new article of manufacture, an article formed of an infusible phenolic condensation product having a strip of absorbent fibrous or cellular material autogenously secured to a face thereof, with a member secured to said strip by adhesive, said member being formed of a material not adapted to be directly secured to said condensation product by the use of a cold adhesive.

6. As a new article of manufacture, an article formed of an infusible phenolic condensation product having a strip of absorbent paper autogenously secured to a face thereof, with a wooden member secured to said strip by adhesive.

7. As a new article of manufacture, a piano key formed of an infusible phenolic condensation product having a strip of absorbent fibrous or cellular material autogenously secured to a face thereof, with a key-lever member secured to said strip by adhesive, said member being formed of a material not adapted to be directly secured to said condensation product by the use of a cold adhesive.

In testimony whereof I have signed my name to this specification.

SANDFORD BROWN.